United States Patent
Kwon

(10) Patent No.: US 7,128,337 B2
(45) Date of Patent: Oct. 31, 2006

(54) CUSHION FOR AIR BAG SYSTEMS

(75) Inventor: Hae Wook Kwon, Pusan (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 338 days.

(21) Appl. No.: 10/702,505

(22) Filed: Nov. 7, 2003

(65) Prior Publication Data

US 2005/0082807 A1 Apr. 21, 2005

(30) Foreign Application Priority Data

Oct. 17, 2003 (KR) ...................... 10-2003-0072614

(51) Int. Cl.
*B60R 21/16* (2006.01)
(52) U.S. Cl. ................... 280/743.1; 280/743.2
(58) Field of Classification Search ................ 280/732, 280/739, 743.1, 743.2
See application file for complete search history.

(56) References Cited

U.S. PATENT DOCUMENTS

| | | | |
|---|---|---|---|
| 5,639,118 A * | 6/1997 | Rhule et al. ............. | 280/743.1 |
| 5,683,109 A * | 11/1997 | Birman ..................... | 280/743.2 |
| 5,945,184 A * | 8/1999 | Nagata et al. ............. | 428/35.2 |
| 5,954,361 A * | 9/1999 | Lang ........................ | 280/743.2 |
| 6,257,618 B1 * | 7/2001 | Tschaschke et al. ..... | 280/743.2 |
| 6,315,324 B1 * | 11/2001 | Keshavaraj ............... | 280/743.2 |
| 6,439,606 B1 * | 8/2002 | Okada et al. ............. | 280/743.1 |
| 6,536,800 B1 * | 3/2003 | Kumagai et al. ......... | 280/743.1 |
| 6,692,023 B1 * | 2/2004 | Tokita et al. ............. | 280/743.1 |

* cited by examiner

*Primary Examiner*—Paul N. Dickson
*Assistant Examiner*—Toan C. To
(74) *Attorney, Agent, or Firm*—Greenblum & Bernstein, P.L.C.

(57) ABSTRACT

An air bag system includes a cushion expanded to the front of a passenger by means of gas discharged from an inflator when a collision of the vehicle occurs for absorbing shock transmitted to the passenger. The cushion comprises a main panel having an inlet part formed at one side thereof for allowing the gas discharged from the inflator to be introduced into the cushion therethrough, side panels attached to both open sides of the main panel by means of sewing, respectively, and a tether having one end fixed to the inlet part of the main panel by means of sewing and the other end fixed to the inner side of the panel opposite to the inlet part of the main panel while not intersecting with the parts where the main panel and the side panels are sewn.

9 Claims, 7 Drawing Sheets

CUSHION FOR AIR BAG SYSTEMS

RELATED APPLICATIONS

The present disclosure relates to subject matter contained in Korean Application No. 10-2003-72614, filed on Oct. 17, 2003, which is herein expressly incorporated by reference in its entirety.

BACKGROUND OF THE INVENTION

1. Field of the Invention

The present invention relates to an air bag system mounted in a vehicle, and more particularly to a cushion for air bag systems which is capable of preventing breakage of sewn parts of the cushion caused by means of expansion pressure of the cushion when a collision of the vehicle occurs.

2. Description of the Related Art

Generally, an air bag system for vehicles is mounted in front of a driver seat or a passenger seat in such a manner that a cushion of the air bag system is instantly expanded when a collision of the vehicle occurs for protecting a driver or a passenger from injury.

The air bag systems may be classified into a driver air bag system and a passenger air bag system. The driver air bag system is mounted to the steering wheel of the vehicle for protecting the driver from injury. The passenger air bag system is mounted to an instrument panel of the vehicle disposed in front of the passenger seat for protecting the passenger from injury. Basically, the driver air bag system is requisite, and the passenger air bag system is optional; however, vehicles with passenger air bag systems basically mounted therein for protecting passengers from injury are on the increase in recent years.

FIG. 1 is a cross-sectional view showing a passenger air bag system according to the conventional art, FIG. 2 is a perspective view showing the passenger air bag system according to the conventional art, FIG. 3 is a perspective view showing a cushion of the passenger air bag system according to the conventional art, and FIG. 4 is a plan view showing an inlet part of the cushion of the passenger air bag system according to the conventional art.

As shown in FIGS. 1 and 2, the conventional passenger air bag system for vehicles comprises: an air bag housing 4 mounted in an instrument panel 2; an inflator 6 attached to the air bag housing 4 for discharging gas when a collision of the vehicle occurs; a retainer 8 attached to the inside of the air bag housing 4 and having a plurality of gas-discharging holes for discharging gas from the inflator 6; and a cushion 10 accommodated in the air bag housing 4 such that the cushion 10 is expanded toward a passenger seat by means of gas discharged through the air-discharging holes of the retainer 8, the cushion 10 being fixed to the retainer 8 at one side thereof.

The air bag housing 4 comprises: a cushion housing 12 attached to the rear part of the instrument panel 2, the cushion housing 12 being formed in the shape of a box with the front part opened so that the cushion 10 is accommodated in the cushion housing 12; and a can housing 14 connected to the rear part of the cushion housing 12, wherein the inflator 6, which supplies high-pressure gas to the cushion 10 when a collision of the vehicle occurs, is disposed in the can housing 14.

The cushion housing 12 is provided at both longitudinal sides thereof with flanges 12a, respectively, which are fixed to the instrument panel 2 by means of bolts. The can housing 14 is provided at the outside thereof with a mounting bracket 16, which is fixed to a cowl cross member 18 by means of a bolt.

The inflator 6 is connected to a collision-detecting sensor (not shown) for detecting a collision of the vehicle so that the inflator 6 is exploded by means of a signal outputted from the collision-detecting sensor when the collision of the vehicle occurs. The cushion 10 is expanded toward the front of the cushion housing 12 by means of gas having a prescribed pressure, which is generated from the explosion of the inflator 6.

The instrument panel 2 is broken along a cut line 2a formed at the instrument panel 2 by means of the cushion 10 expanded as described above. Consequently, the cushion 10 is expanded toward the passenger seated in the passenger seat of the vehicle.

As shown in FIGS. 3 and 4, the cushion 10 comprises: a main panel 22 formed in the shape of a cylinder and having an inlet part 20 formed at one side thereof, the inlet part 20 of the main panel 22 being fixed by means of the retainer 8; side panels 24 attached to both open sides of the main panel 22 by means of sewing, respectively; and a tether 26 having one end fixed to the inlet part 20 of the main panel 22 and the other end fixed to the inner side of the panel 22, which is opposite to the inlet part 20 of the main panel 22.

The main panel 22 is formed in such a manner that a long strip is rolled in the shape of a cylinder and then stitched. The main panel 22 is the front part of the cushion 10, which approaches a passenger when the cushion 10 is expanded. To the sides of the main panel 22 are attached the side panels 24 by means of a first sewing part 28, respectively.

Each of the side panels 24 has a ventilation hole 24a formed at a prescribed part thereof for discharging gas introduced into the cushion 10 to the outside. When the passenger contacts the cushion 10 due to the impact caused when a collision of the vehicle occurs, the gas in the cushion 10 is discharged to the outside through the ventilation hole 24a so that shock transmitted to the passenger is effectively absorbed.

The tether 26 is formed in the shape of a long strip. One end of the tether 26 is fixed to the inlet part 20 of the main panel 22 by means of a second sewing part 30. The other end of the tether 26 is fixed to the inner side of the front part of the main panel 22 opposite to the inlet part 20 of the main panel 22, by which the shape of the expanding cushion 10 is determined.

One end of the tether 26 with the above-stated construction is fixed to the inlet part 20 of the main panel 22 so that the tether 26 forms the inlet part 20 together with the main panel 22. The inlet part 20 of the main panel 22 is provided at the center thereof with a gas-introducing hole 20a, which communicates with the gas-discharging holes of the retainer 8 for introducing the gas discharged from the inflator 6 into the cushion 10. Around the gas-introducing hole 20a formed at the inlet part 20 of the main panel 22 are formed a plurality of fixing holes 20b, through which the inlet part 20 of the main panel 22 is attached to the can housing 14 along with the retainer 8 by means of bolts.

Especially, one end of the tether 26 is formed with the same width as the inlet part 20. Both sides of the tether 26 are sewn with the main panel 22 and the side panels 24, by which the first sewing part 28 is formed. The second sewing part 30 is formed in the lateral direction of the tether 26 so that the first and second sewing parts 28 and 30 intersect each other at both sides A of one end of the tether 26.

Alternatively, one end of the tether 26 may be fixed to the main panel 22 by means of sewing while not forming the inlet part 20 together with the main panel 22. In this case, it is required to attach a plurality of additional reinforcing cloths to the main panel 22 so that the strength of the inlet part 20 is increased.

Preferably, the tether 26 and the main panel 22 together form the inlet part 20. Consequently, durability and thermal resistance of the inlet part 20 are increased by means of the tether 26, which requires no reinforcing cloths or only a reduced number of reinforcing cloths.

The operation of the conventional passenger air bag system with the above-stated construction will now be described. When a collision of the vehicle is detected by means of the collision-detecting sensor, a signal outputted from the collision-detecting sensor is transmitted to the inflator 6 so that the inflator 6 is exploded to generate gas.

The gas generated by means of the inflator 6 flows along the air bag housing 4 so that the gas is supplied to the gas-discharging holes of the retainer 8 and the inlet part 20 of the cushion 10. The gas supplied to the inlet part 20 is introduced into the cushion 10 through the gas-introduction hole 20a.

Consequently, the cushion 10 is expanded to the front of the passenger seat at prescribed pressure and speed by means of the gas introduced into the cushion 10, and shock transmitted to the passenger is effectively absorbed by means of the expanded cushion 10, whereby the passenger is protected from injury when a collision of the vehicle occurs.

In the conventional passenger air bag system, however, the expanding stress of the cushion 10 is applied to the first sewing part 28, and simultaneously the stress caused from the expansion of the cushion 10 is applied to the second sewing part 30, when the cushion 10 is expanded by means of the gas discharged from the inflator 6 due to the collision of the vehicle.

At this time, the stress applied to the first sewing part 28 and the stress applied to the second sewing part 30 are concentrated at the sides A of one end of the tether 26 where the first sewing part 28 and the second sewing part 30 intersect each other.

When the stresses are concentrated at the parts A where the first sewing part 28 and the second sewing part 30 intersect each other as described above, the stress applied to the first sewing part 28 and the stress applied to the second sewing part 30 are increased with the result that the parts A where the first sewing part 28 and the second sewing part 30 intersect each other are torn when the cushion 10 is expanded. As a result, the cushion may be easily damaged.

In the case that the cushion 10 is damaged during the expansion of the cushion 10, the passenger air bag system cannot function. Consequently, shock transmitted to the passenger is not effectively absorbed when a collision of the vehicle occurs, and thus the passenger is not protected from injury.

SUMMARY OF THE INVENTION

Therefore, the present invention has been made in view of the above problems, and it is an object of the present invention to provide a cushion for air bag systems wherein a first sewing part sewing a main panel and side panels of the cushion and a second sewing part sewing the main panel and one end of a tether do not intersect each other at one side of the tether so that stress applied to the first sewing part and stress applied to the second sewing part are not combined, whereby damage of the cushion caused due to stress concentration is prevented.

In accordance with the present invention, the above and other objects can be accomplished by the provision of a cushion for an air bag system, the air bag system including a cushion expanded to the front of a passenger by means of gas discharged from an inflator when a collision of the vehicle occurs for absorbing shock transmitted to the passenger, wherein the cushion comprises: a main panel having an inlet part formed at one side thereof for allowing the gas discharged from the inflator to be introduced into the cushion therethrough; side panels attached to both open sides of the main panel by means of sewing, respectively; and a tether having one end fixed to the inlet part of the main panel by means of sewing and the other end fixed to the inner side of the panel opposite to the inlet part of the main panel while not intersecting with the parts where the main panel and the side panels are sewn.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 1:
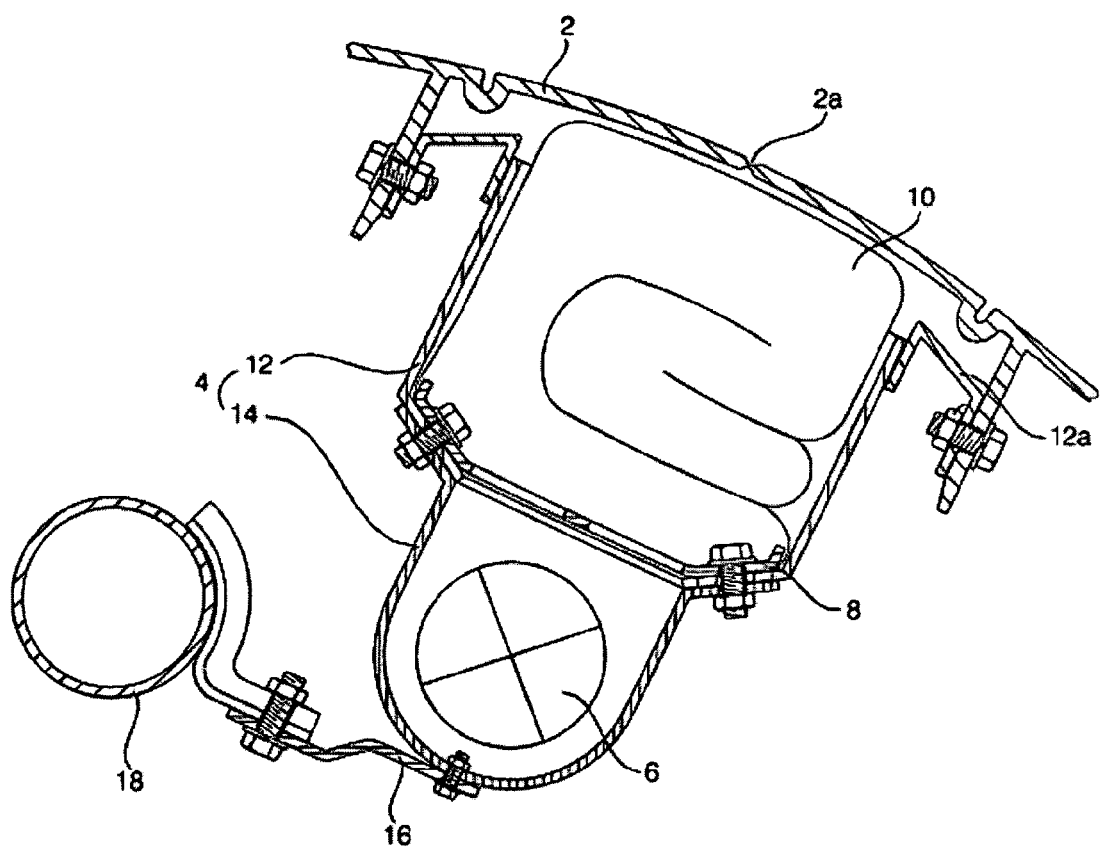
FIG. 1 is a cross-sectional view showing a passenger air bag system according to the conventional art.
Figure 2:
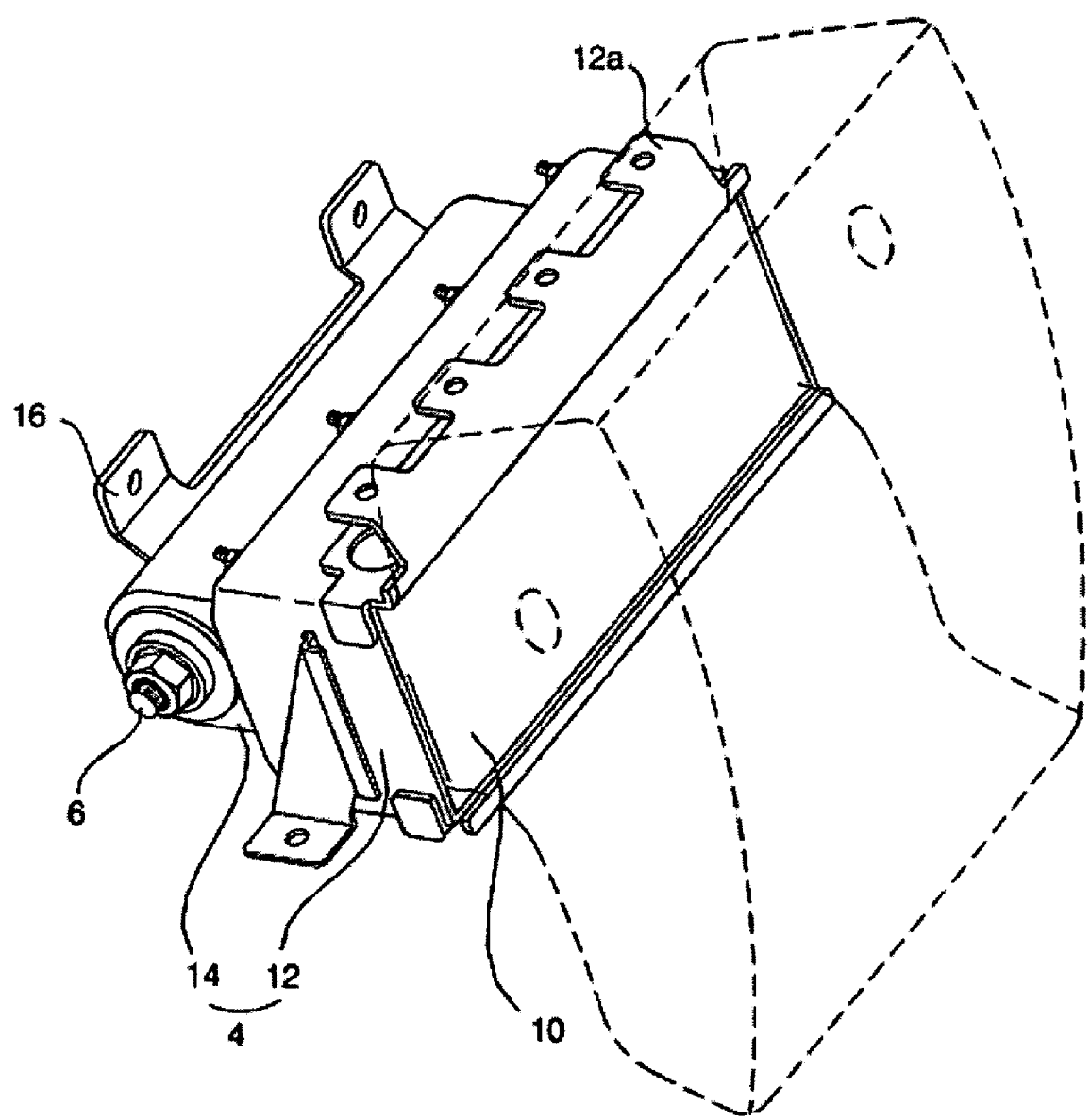
FIG. 2 is a perspective view showing the passenger air bag system according to the conventional art.
Figure 3:
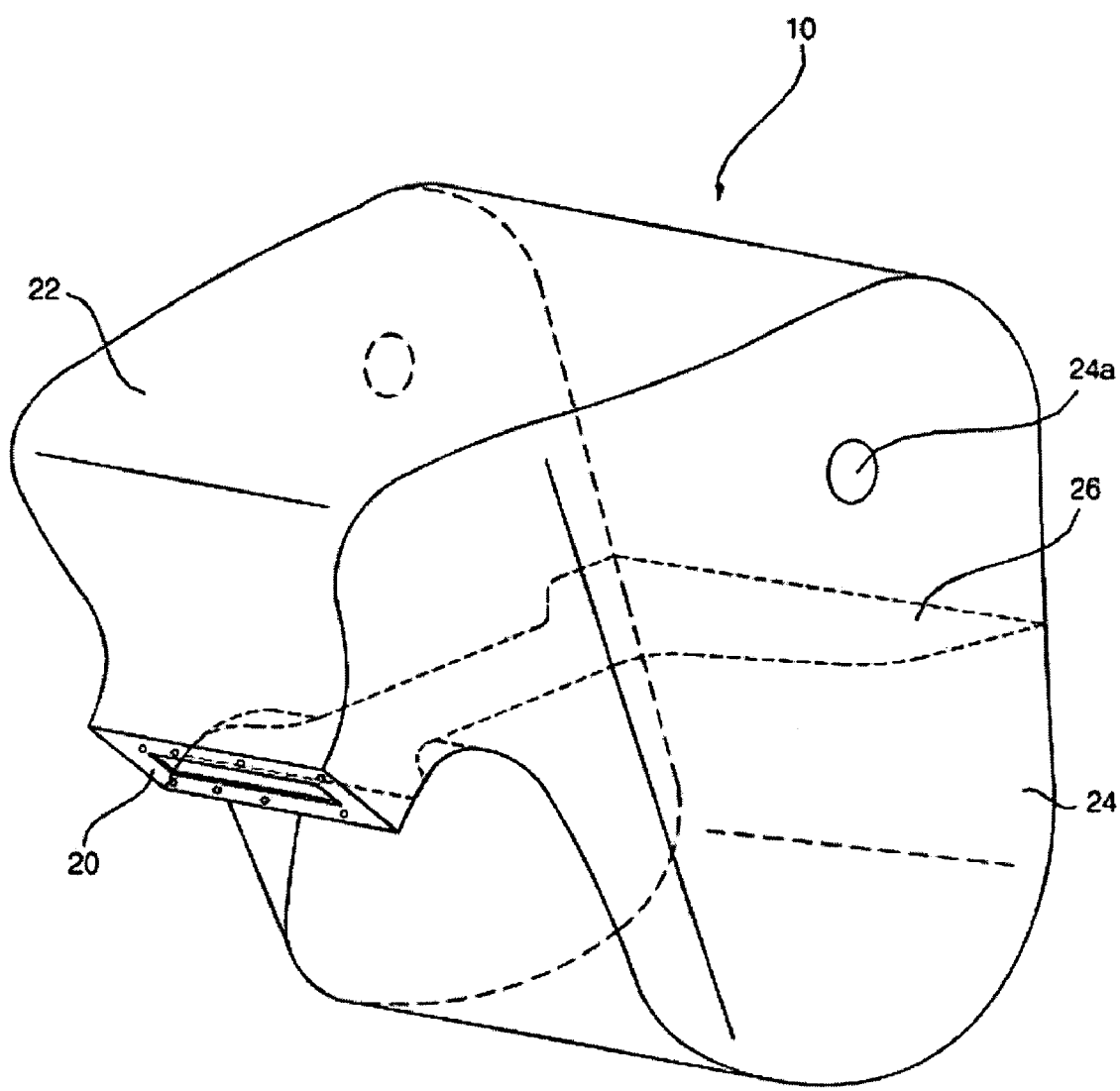
FIG. 3 is a perspective view showing a cushion of the passenger air bag system according to the conventional art.
Figure 4:
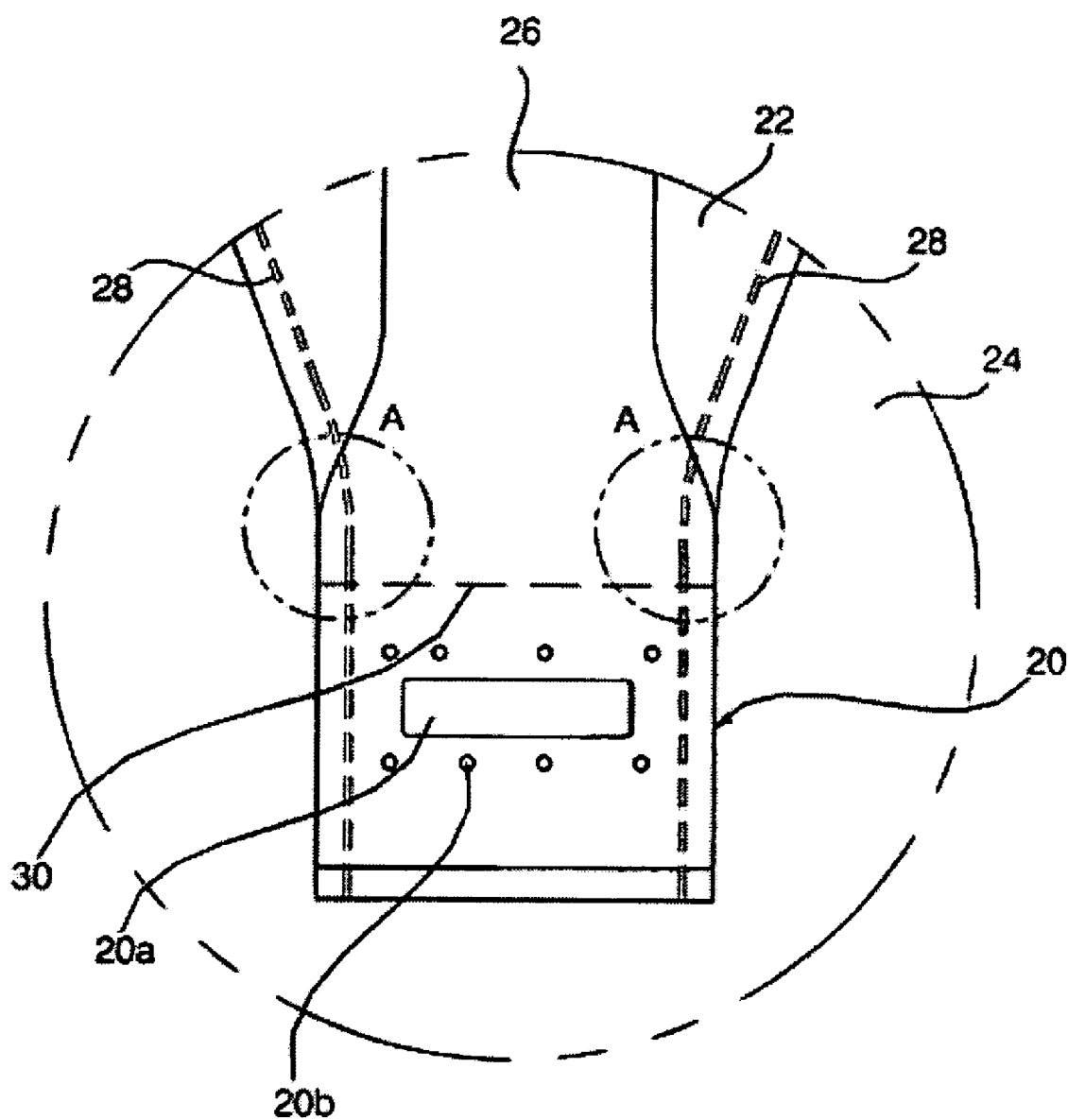
FIG. 4 is a plan view showing an inlet part of the cushion of the passenger air bag system according to the conventional art.
Figure 5:
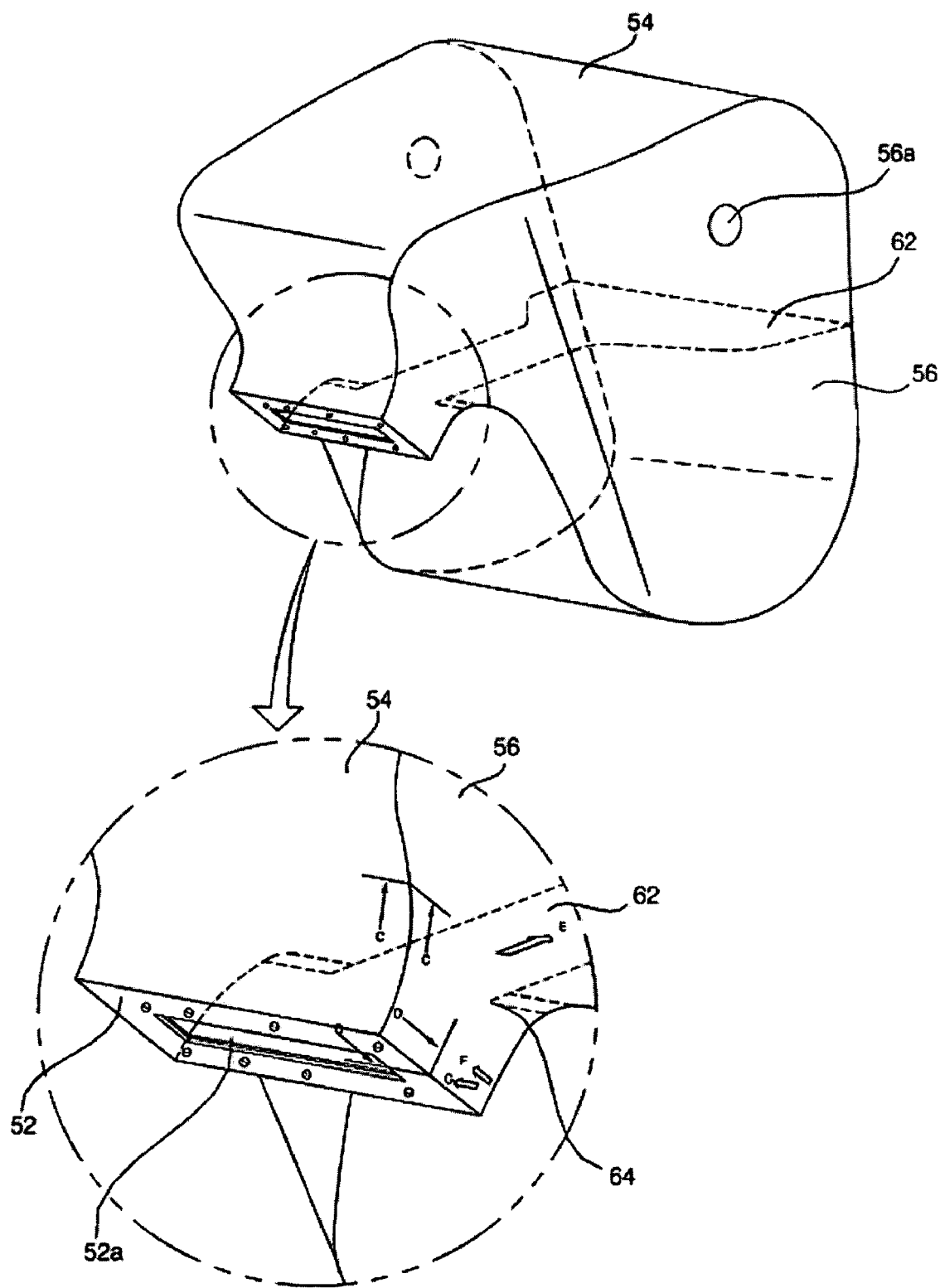
FIG. 5 is a perspective view showing a cushion of a passenger air bag system according to a preferred embodiment of the present invention.
Figure 6:
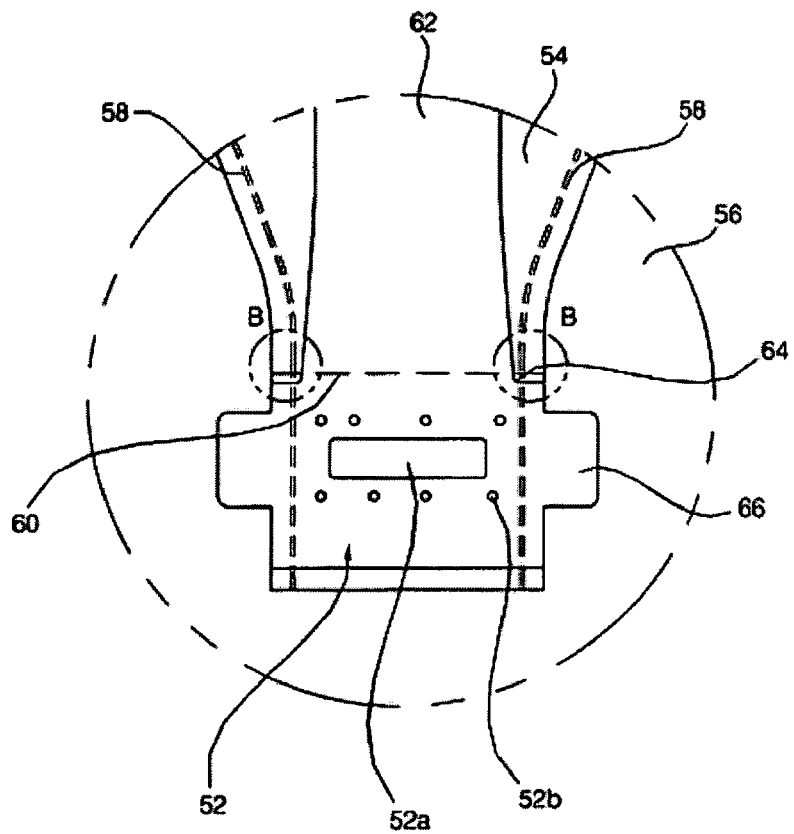
FIG. 6 is a plan view showing an inlet part of the cushion of the passenger air bag system according to the preferred embodiment of the present invention.
Figure 7:
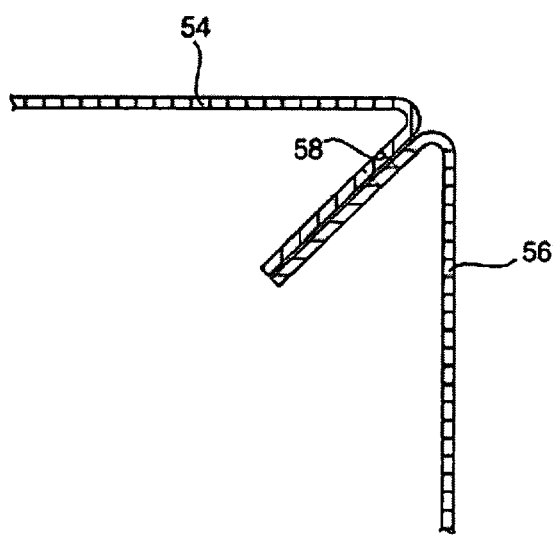
FIG. 7 is a cross-sectional view taken along the line C—C of FIG. 5.
Figure 8:
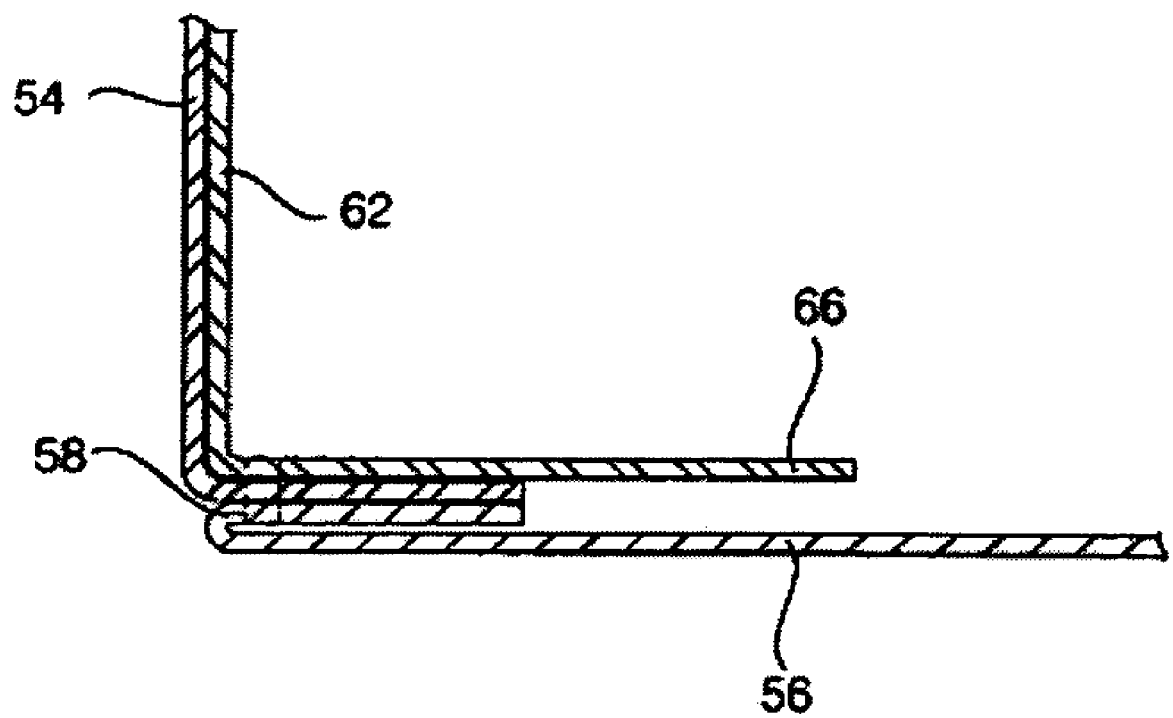
FIG. 8 is a cross-sectional view taken along the line D—D of FIG. 5.

FIG. 5 is a perspective view showing a cushion of a passenger air bag system according to a preferred embodiment of the present invention, FIG. 6 is a plan view showing an inlet part of the cushion of the passenger air bag system according to the preferred embodiment of the present invention, FIG. 7 is a cross-sectional view taken along the line C—C of FIG. 5, and FIG. 8 is a cross-sectional view taken along the line D—D of FIG. 5.

In the drawings, the same or similar elements are denoted by the same reference numerals even though they are depicted in different drawings.

As shown in FIGS. 5 to 8, the cushion of the passenger air bag system according to the present invention comprises: a main panel 54 formed in the shape of a cylinder and having an inlet part 52 formed at one side thereof, the inlet part 52 of the main panel 54 being fixed to the air bag housing 4 by means of the retainer 8; side panels 56 attached to both open sides of the main panel 54 by means of sewing, respectively;

and a tether 62 having one end fixed to the inlet part 52 of the main panel 54 and the other end fixed to the inner side of the panel 54, which is opposite to the inlet part 52 of the main panel 54. At the tether 62 are not formed intersection parts B where a first sewing part 58 sewing the main panel 54 and the sides panels 56 and a second sewing part 60 sewing the main panel 54 and one end of the tether 62 intersect each other.

The main panel 54 is formed in such a manner that a long strip is rolled in the shape of a cylinder and then stitched. The main panel 54 is the front part of the cushion 10, which approaches a passenger when the cushion 10 is expanded. To the sides of the main panel 54 are attached the side panels 56, respectively.

The main panel 54 and the side panels 56 are made of fibrous materials. The main panel 54 and the side panels 56 are attached to each other by means of a first sewing part 58.

Each of the side panels 56 has a ventilation hole 56a formed at a prescribed part thereof for discharging gas introduced into the cushion 10 to the outside. When the passenger contacts the cushion 10 due to the impact caused when a collision of the vehicle occurs, the gas in the cushion 10 is discharged to the outside through the ventilation hole 56a so that shock transmitted to the passenger is effectively absorbed.

The tether 62 is formed in the shape of a long strip. One end of the tether 62 is fixed to the lower part of the inlet part 52 of the main panel 54 by means of sewing. The other end of the tether 62 is fixed to the inner side of the front part of the main panel 54 opposite to the inlet part 52 of the main panel 54, by which the shape of the expanding cushion 10 is determined.

Specifically, the inlet part 52 of the main panel 54 and the front part of the main panel 54 are connected by means of the tether 62 so that the expanded length of the cushion 10 toward the passenger seated in the passenger seat is restricted when a collision of the vehicle occurs, whereby the passenger is protected from the expanding pressure of the cushion 10, and thus injury to the passenger is prevented.

One end of the tether 62 with the above-stated construction is fixed to the inlet part 52 of the main panel 54 so that the tether 62 forms the inlet part 52 together with the main panel 54. The inlet part 52 of the main panel 54 is provided at the center thereof with a gas-introducing hole 52a, which communicates with the gas-discharging holes of the retainer 8 for introducing the gas discharged from the inflator 6 into the cushion 10. Around the gas-introducing hole 52a formed at the inlet part 52 of the main panel 54 are formed a plurality of fixing holes 52b, through which the inlet part 52 of the main panel 54 is attached to the retainer 8 by means of bolts.

Especially, one end of the tether 62 is formed with the same width as the inlet part 52. Both sides of the tether 62 are sewn together with the first sewing part 58, by means of which the main panel 54 and the side panels 56 are sewn, and the second sewing part 60, by means of which the main panel 54 and the lower part of one end of the tether 62 are sewn, is formed in the lateral direction of the tether 62 so that the intersection parts B where the first and second sewing parts 58 and 60 intersect each other are formed at both sides of the inlet part 52.

When the cushion 10 is expanded by means of the gas introduced into the cushion 10 through the gas-introduction hole 52a of the inlet part 52, the main panel 54 and the side panels 56 are expanded. At this time, tension stresses F and G are applied to the first sewing part 58. As the cushion 10 is expanded forward, tension stress E is applied to the second sewing part 60.

At the intersection parts B where the first and second sewing parts 58 and 60 intersect each other are formed notches 64 so that the stress concentration caused by the combination of the tension stresses E, F, and G applied to the first and second sewing parts 58 and 60 is prevented. Consequently, the intersection parts B where the first and second sewing parts 58 and 60 intersect each other are not provided at the tether 62.

The notches 64 are formed at both sides of one end of the tether 62 where the second sewing part 60 is formed in such a manner that the notches 64 are symmetrically provided at the sides of the tether 62. Consequently, one end of the tether 62 is disposed between the first sewing parts 58. The intersection parts B where the first and second sewing parts 58 and 60 intersect each other are disposed outside the tether 62 so that the tension stresses F and G applied to the main panel 54 and the side panels 56 are not combined with the tension stress E applied to the main panel 54 and the tether 62 when the cushion 10 is expanded.

The notches 64 are formed with L-shaped steps such that the width of the tether 62 is reduced. Specifically, the L-shaped steps are formed at both sides of one end of the tether 62, respectively. Preferably, the stepped parts are rounded.

At both sides of one end of the tether 62 are integrally formed wing parts 66, which are extended in the lateral direction of the tether 62, respectively, so that the wing parts 66 cover the first sewing part 58 at the inlet part 52. Consequently, the first sewing part 58 is protected against heat from the gas introduced through the gas-introducing hole 52a by means of the wing parts 66.

Damage to the first and second sewing parts 58 and 60, which is caused by the gas introduced through the gas-introducing hole 52a, is prevented by appropriately selecting a process for sewing the first and second sewing parts 58 and 60 and a thread used for the first and second sewing parts 58 and 60. Especially, the first sewing part 58 is preferably doubly sewn so that durability and thermal resistance of the first sewing part 58 are further improved.

At the inlet part 52 may be attached additional reinforcing cloths for reinforcing the strength thereof. Since the one end of the tether 62 forms the inlet part 52, however, the number or the thickness of the reinforcing cloths is decreased as compared to the conventional cushion as mentioned above.

Now, the operation of the passenger air bag system with the above-stated construction according to the present invention will be described in detail.

When a collision of the vehicle is detected by means of the collision-detecting sensor, a signal outputted from the collision-detecting sensor is transmitted to the inflator 6 so that the inflator 6 is exploded to generate gas. The gas generated by means of the inflator 6 flows along the air bag housing 4 so that the gas is supplied to the inlet part 52 of the cushion 10, which communicates with the gas-discharging holes of the retainer 8. The gas supplied to the inlet part 52 is introduced into the cushion 10 through the gas-introduction hole 52a.

The cushion 10 is expanded to the front of the passenger seat at prescribed pressure and speed by means of the gas introduced into the cushion 10. When the passenger makes contact with the front part of the cushion 10 due to a collision of the vehicle, the gas in the cushion 10 is discharged to the outside through the ventilation holes 56a formed at the sides of the cushion 10 so that shock transmitted to the passenger is effectively absorbed.

At this time, the stresses E, F, and G, which are generated by the pressure of the gas, are applied to the main panel 54, the side panels, and the tether 62, which together constitutes the cushion 10, when the cushion 10 is expanded. As a result, tension stresses act on the first and second sewing parts 58 and 60, respectively.

As described above, the intersection parts B where the first and second sewing parts 58 and 60 intersect each other are provided at the main panel 54 outside the tether 62 due to the notches 64 formed at the tether 62. Consequently, the tension stresses acting on the first and second sewing parts 58 and 60 are not combined.

As apparent from the above description, the present invention provides a cushion for air bag systems wherein the cushion has notches formed at one end of a tether so that a first sewing part sewing a main panel and side panels of the cushion and a second sewing part sewing the main panel and the end of the tether do not intersect each other, whereby stresses act on the first and second sewing parts separately, not in combination, when the cushion is expanded by means of gas generated from an inflator due to a collision of the vehicle. Consequently, the present invention has an effect of preventing occurrence of the stress concentration.

When the phenomenon of the stress concentration is eliminated as described above, damage to the cushion is prevented. As a result, it is possible to use an inflator, which is capable of generating higher gas pressure than the conventional inflator. It is also possible to prevent malfunction of the air bag system due to the damage to the cushion.

Furthermore, the cushion is not damaged when the air bag system is operated, whereby safety and reliability of the air bag system are improved. Especially, efficiency of the air bag system is increased, and thus a passenger is safely protected from injury when a collision of the vehicle occurs.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A cushion for an air bag system, the air bag system including a cushion expandable to the front of a passenger by gas discharged from an inflator when a collision of a vehicle occurs to absorb shock transmitted to the passenger, wherein the cushion comprises:
    a main panel having an inlet part provided at one side thereof to allow the gas discharged from the inflator to be introduced into the cushion therethrough;
    side panels attached to both open sides of the main panel by sewing, respectively; and
    a tether having one end fixed to the inlet part of the main panel by sewing and the other end fixed to an inner side of the main panel opposite to the inlet part of the main panel,
    wherein a first sewing part along which the main panel and the side panel are sewn together and a second sewing part along which the one end of the tether and the main panel are sewn together provide an intersection that is positioned outside of the one end of the tether.

2. The cushion as set forth in claim 1, wherein the one end of the tether is fixed to the main panel so that the tether forms the inlet part together with the main panel.

3. The cushion as set forth in claim 2, wherein the tether is sewn to the first sewing part.

4. The cushion as set forth in claim 3, wherein the tether has notches provided at both sides of the one end thereof where the second sewing part is provided.

5. The cushion as set forth in claim 4, wherein the notches include steps such that a width of the tether is reduced.

6. The cushion as set forth in claim 5, wherein the portion of the one end of the tether is disposed between the parts where the first and second sewing parts intersect each other.

7. The cushion as set forth in claim 4, wherein the notches are formed with L-shaped steps.

8. The cushion as set forth in claim 7, wherein the stepped parts are rounded.

9. The cushion as set forth in claim 8, wherein the tether has wing parts provided at both sides of the one end of the tether such that the wing parts cover the first sewing part at the inlet part.

* * * * *